United States Patent [19]

Walters

[11] Patent Number: 5,018,345

[45] Date of Patent: May 28, 1991

[54] CROP HARVESTER HAVING ANGULAR DRAFT TONGUE FOR ACCOMMODATING SHARP TURNS

[75] Inventor: James C. Walters, Ottumwa, Iowa

[73] Assignee: Deere & Company, Moline, Ill.

[21] Appl. No.: 529,796

[22] Filed: May 29, 1990

[51] Int. Cl.$^5$ ............................................. A01D 34/00
[52] U.S. Cl. ..................................... 56/14.9; 56/15.8; 56/DIG. 14
[58] Field of Search ...................... 56/14.9, 15.1, 15.2, 56/15.3, 15.4, 15.5, 15.6, 15.7, 15.8, DIG. 14

[56] References Cited

U.S. PATENT DOCUMENTS

| | | | |
|---|---|---|---|
| 1,980,046 | 11/1934 | Frederiksen | 56/DIG. 14 |
| 4,662,162 | 5/1987 | Bettercourt et al. | 56/14.9 X |
| 4,873,818 | 10/1989 | Turner | 56/15.8 X |

Primary Examiner—William P. Neuder

[57] ABSTRACT

A draft tongue is horizontally adjustably connected to the left-hand end of a wheel-supported main frame of a crop harvester for movement between an outward working position and an inward transport or traveling position. The tongue includes front and rear portions which are disposed angularly relative to each other and, when the torque is in its working position, the rear portion extends outwardly from a straight ahead direction and the front portion extends forwardly and downwardly in a vertical plane extending in the straight ahead direction when the tongue is in its working position. The angular shape of the draft tongue permits a towing tractor to turn sharply to the right to cause the harvester to pivot about an axis located adjacent a left-hand tire thereof so as to effect the cutting of a square corner when the tongue is in its working position and permits the tractor to travel straight ahead in a path which is within the width of a path traveled by the harvester when the tongue is in its transport position. A driveline including a pedestal shaft supported by the front portion of the tongue establishes a substantially straight connection with a tractor PTO shaft and with a harvester gear box with a wide-angle, constant velosity u-joint being located at the only location in the driveline which is substantially angled from the straight ahead position when the tongue is in its working position and the tractor is traveling straight ahead.

2 Claims, 4 Drawing Sheets

CROP HARVESTER HAVING ANGULAR DRAFT TONGUE FOR ACCOMMODATING SHARP TURNS

BACKGROUND OF THE INVENTION

The present invention relates to draft tongues for towed implements and more specifically relates to draft tongues for towing a driven crop harvester from one side thereof so that the towing tractor follows a path which is offset to one side of the uncut crop and of a path followed by crop treating elements of the harvester.

It is a common practice when towing a crop harvester, such as a mower conditioner, for example, to connect a draft tongue to the left-hand side of the harvester frame. These tongues are usually straight, as viewed from above, and angle leftwardly and forwardly resulting in the driveline coupling the tractor PTO shaft to a gear box carried by the harvester making an angle of 15°-25° relative to the tractor centerline when the tractor is traveling straight ahead.

Two problems are presented by such structures. First, such harvesters must be able to turn sharply or tightly in order to mow all the crop in a corner. For example, the harvester should be capable of providing a 90° turn while cutting without leaving uncut crop. In order to achieve this in a right-hand turn, the right-hand tire of the harvester must stop and pivot on a vertical axis at or near the left-hand tire. The turning radius of a tractor with a trailed implement is restricted by the rear tractor tire contacting the implement tongue. One way currently employed for allowing a tractor to undergo tight turns without interfering with the draft tongue is to provide a tractor drawbar extension which bolts to the drawbar. This moves the implement hitch pin further to the rear of the tractor rear axle and allows the tractor to turn tighter. However, the usage of such a drawbar extension has the disadvantage that the extension must be removed before hooking the tractor to other types of trailed implements.

Second, constantly operating the driveline at a substantial angle to the axis of the tractor PTO shaft when traveling straight ahead reduces the life of the driveline with the situation becoming worse when turning since the angle between the tractor PTO and the driveline increases in proportion to the degree of turn.

SUMMARY OF THE INVENTION

According to the present invention, there is provided an improved draft tongue for towing a trailed implement from one side thereof and more particularly there is provided a draft tongue constructed so as to overcome the above-noted disadvantages of the prior art.

An object of the invention is to provide a crop harvester having a side-mounted draft tongue which permits the towing tractor to turn sharply without the need of a drawbar extension.

Another object of the invention is to provide a crop harvester having a side-mounted draft tongue which carries a pedestal shaft section of a driveline such that it is in direct alignment with the tractor PTO when the tractor is traveling straight ahead thereby permitting the use of standard u-joints at the opposite ends of a shaft section interconnecting the pedestal shaft with the tractor PTO.

Yet another object of the invention is provide a crop harvester having a side-mounted draft tongue which is configured so as to permit the tongue to be swung to an inward transport position wherein the harvester trails directly behind the tractor.

These and other objects are accomplished by a draft tongue mounted to the side of a harvester frame for swinging about a vertical axis between an outward working or field position and an inward transport or traveling position. The draft tongue, as considered in its working position coupled to a drawbar of a towing tractor, includes a front portion which is located in a fore-and-aft vertical plane and is angled downwardly from the forward end of a rearward portion which is substantially horizontal and angled outwardly in a range from 35°-45° from a straight ahead direction. When the tongue is in its transport position, the rear portion extends near to the straight ahead direction. The harvester driveline includes a pedestal shaft which is carried by the front portion of the tongue in substantial alignment with a PTO shaft of the tractor. The driveline further includes a front telescopic drive shaft having standard u-joints at the opposite ends thereof which are respectively coupled to the forward end of the pedestal shaft and the PTO shaft, and includes a rear telescopic drive shaft having a wide-angle constant velocity u-joint at its forward end connected to the rear end of the pedestal shaft, and having a standard u-joint at its rearward end connected to a gear box carried at the right hand end of the harvester.

DESCRIPTION OF THE PREFERRED EMBODIMENT

Figure 1:
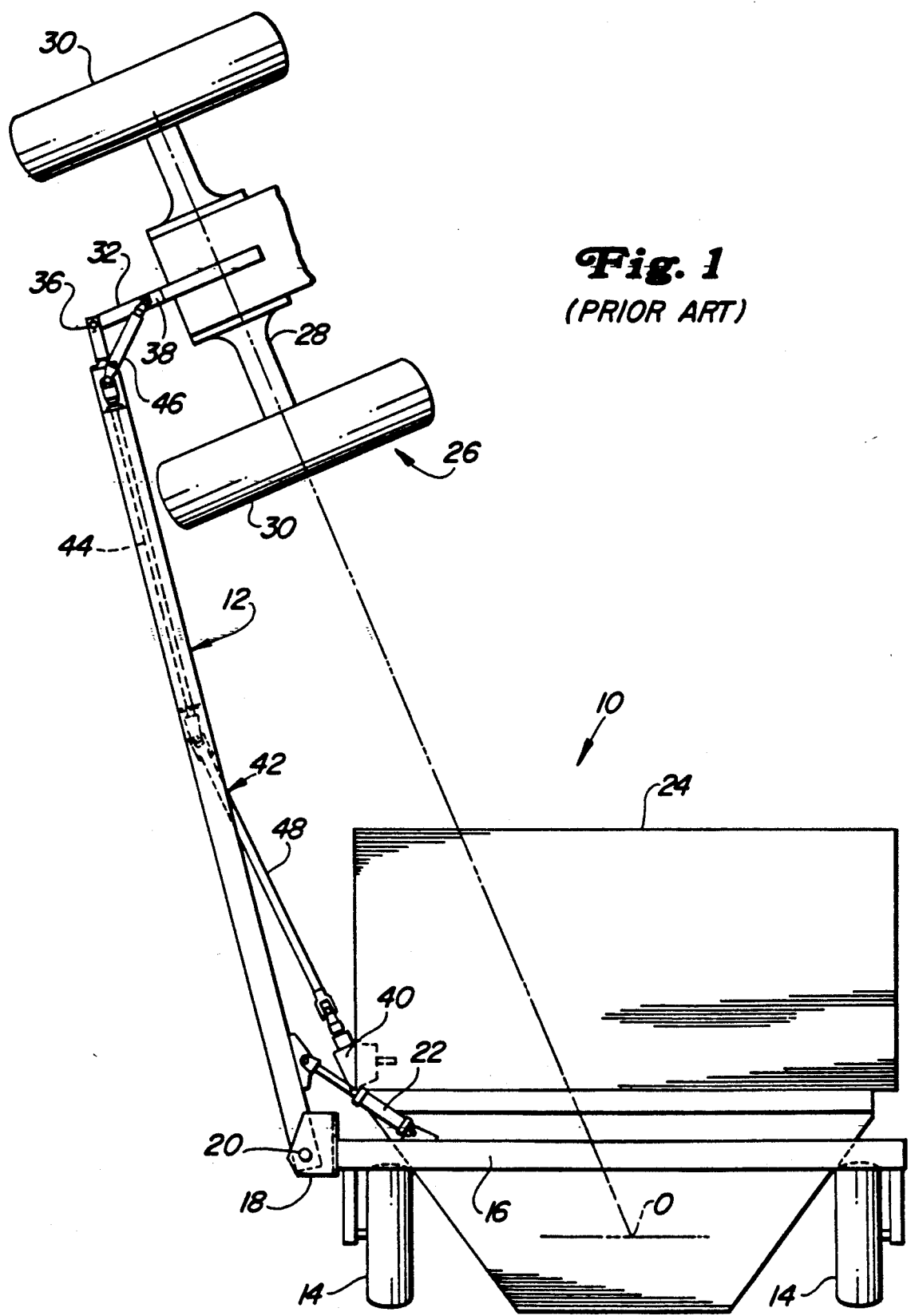
FIG. 1 is a top plan view showing a tractor connected to a crop harvester by means of a tongue constructed in accordance with the prior art, the tractor shown undergoing the sharpest turn of which it is capable without the tires thereof interfering with the tongue.

Referring now to FIG. 1, there is shown a crop harvester 10 having a tongue 12 which is representative of the tongues of prior art harvesters. Specifically, the harvester 10, here shown in the form of a mower conditioner, includes a pair of ground wheels 14 connected to opposite end locations of a main cross frame member 16. Joined to the left end of the frame member 16 is a bracket 18 including a pair of superposed plates between which the rear end of the tongue 12 is received and to which the tongue is horizontally pivotally attached by means of an upright pin 20. An extensible and retractable hydraulic cylinder and piston unit 22 is connected between the tongue for selectively positioning the tongue either in an outwardly angled working position, as shown, or in an inward transport or traveling position wherein the tongue extends straight ahead along side a left end of a header 24 of the harvester, the header including a driven cutterbar assembly (not shown) for severing standing crop from the ground. A tractor 26 includes a rear axle housing 28 having opposite ends from which rear axles (not shown) project, the axles carrying respective rear wheels 30. The tractor 26 is equipped with a drawbar 32 and a clevis 34 provided at the forward end of the tongue 12 is connected to the drawbar by a hitch pin 36.

The tractor 26 is provided with a PTO shaft 38, the harvester 10 includes a main drive gear box 40 and a driveline 42 transmits power from the PTO shaft to the gear box. Specifically, the driveline 42 includes an intermediate pedestal shaft 44 mounted to a forward portion of the tongue 12 and has its forward end coupled to the PTO shaft by means of a front telescopic shaft 46 and having its rear end coupled to the gear box by means of a rear telescopic shaft 48, the shafts 46 and 48 each having u-joints at their opposite ends.

As viewed from the top, the intermediate pedestal shaft 44 is aligned with a forward portion of the tongue 12 with that result that when the tractor is traveling straight ahead with the tongue 12 in its working position the u-joints at the opposite ends of the front telescopic shaft 46 will constantly be operating at a substantial angle with the angle becoming more severe during right-hand turns of the tractor. Such angled operation of the u-joints decreases their life and ability to transmit power.

Furthermore, it can be seen that when the tractor 26 is making the sharpest right-hand turn it can make, the harvester will pivot about a point 0 located about half way between the right- and left-hand tires 14 with such a pivot point resulting in other than a clean, square corner cut of the crop. While bolting a drawbar extension to the drawbar 32 would result in the pivot point 0 being moved closer to the left-hand wheel 14 thereby resulting in the right-hand tire 14 of the harvester undergoing retrograde motion about such axis and in clean, square corner cuts, the use of such an extension has the drawback that it must be taken off in order for the tractor to be used with various other implements.

Figure 2:
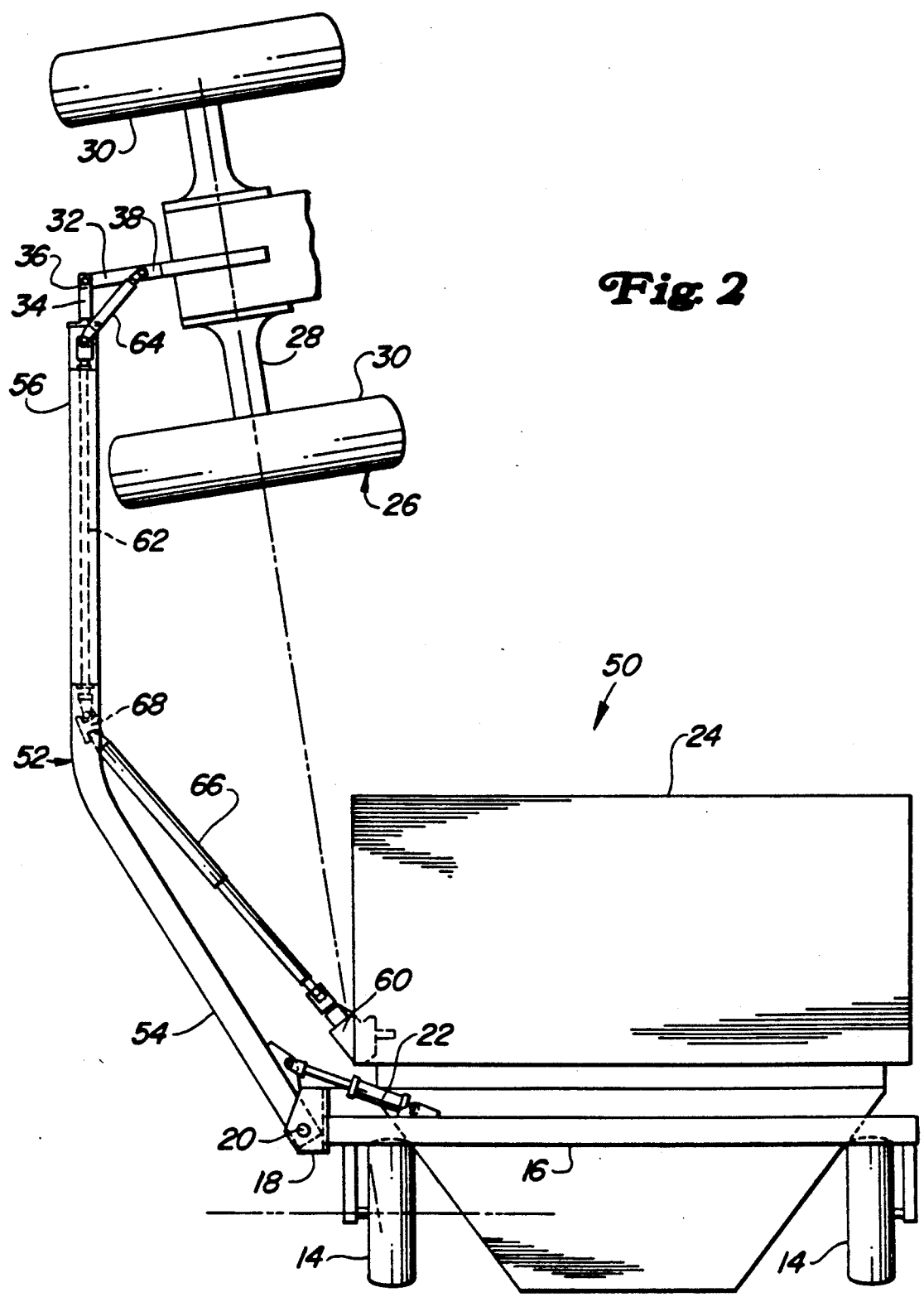
FIG. 2 is a top plan view similar to that of FIG. 1 but showing a crop harvester having a tongue constructed in accordance with the principles of the present invention.
Figure 3:
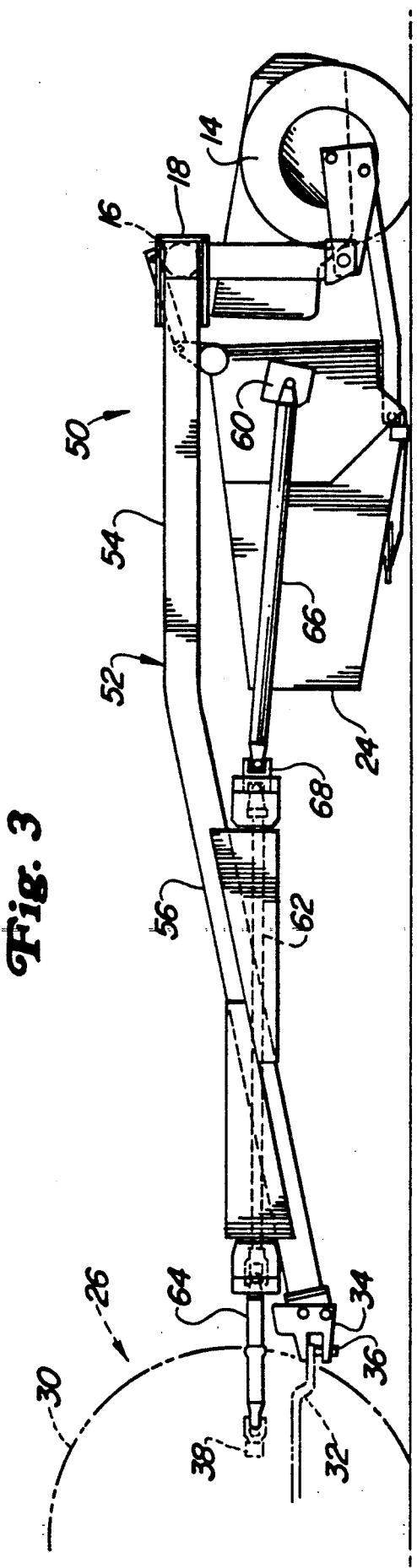
FIG. 3 is a left side elevational view of the tractor and crop harvester shown in FIG. 2.
Figure 4:
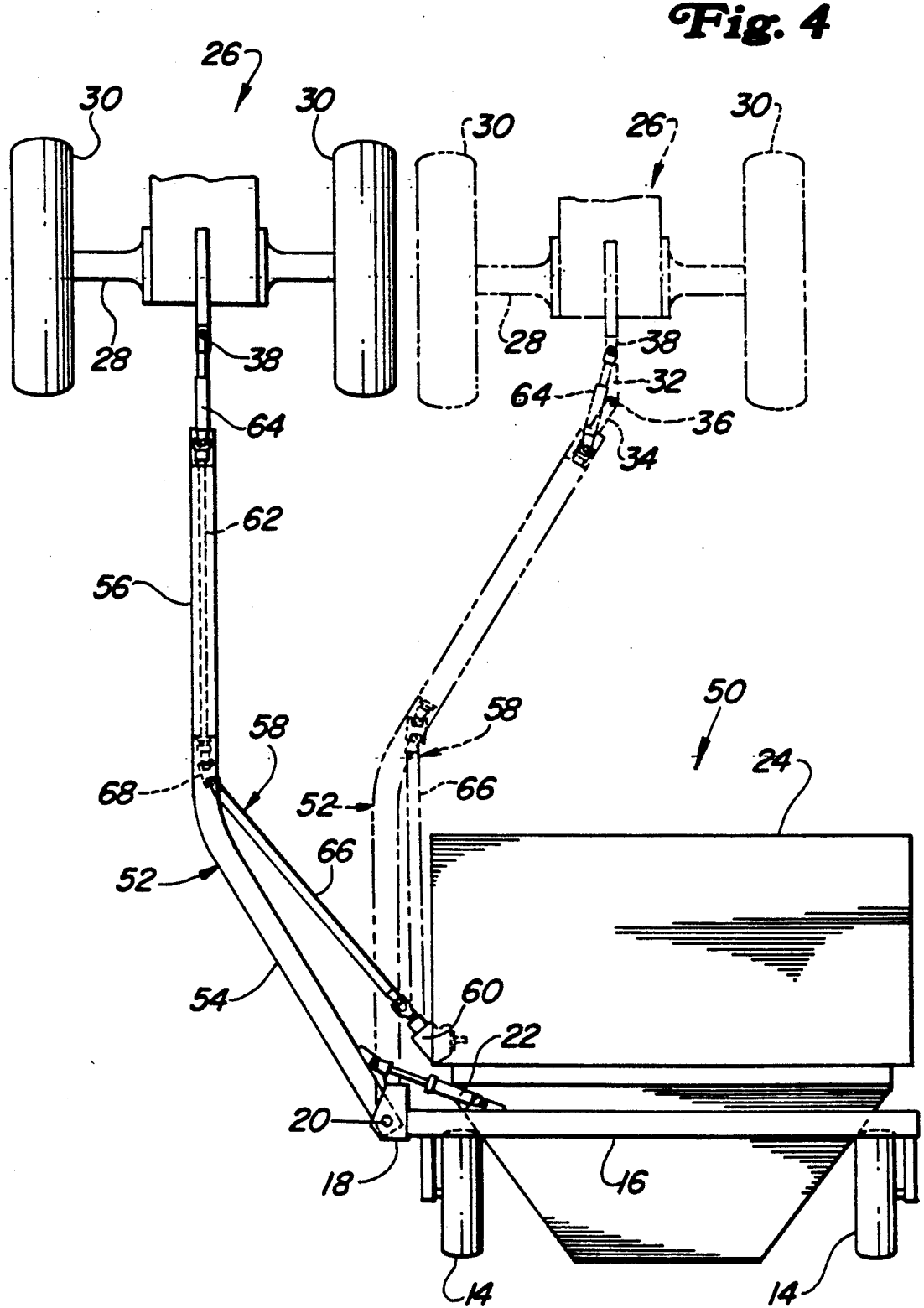
FIG. 4 is a top plan view similar to FIG. 2 but showing the tractor oriented for traveling straight ahead and showing the tongue and tractor in broken lines in the transport position.

Preliminary to describing what is shown if FIGS. 2-4, it is to be noted that for the sake of simplicity, the same reference numerals used to refer to parts depicted in FIG. 1 are used to refer to similar parts depicted in FIGS. 2-4. Referring now to FIGS. 2-4, there is shown a harvester 50 which is equipped with a tongue 52 constructed in accordance with the principles of the present invention. Specifically, the tongue 52 includes a substantially horizontal rear portion 54 having its rear end coupled to the bracket 1B by the pin 20 and having a length slightly longer than the distance from the pin 20 to the front of the header 24. When considered in a working position with the tractor 26 traveling straight ahead as depicted in solid lines in FIG. 4, the rear tongue portion 54 is angled outwardly and forwardly from the bracket 18 by an angle which preferraby is in the neighborhood of from 35°-45° from straight ahead. A forward tongue portion 56 is joined to and is inclined downwardly and forwardly from the forward end of the rear tongue portion 54, the forward tongue portion being located in a vertical plane located along the fore-and-aft centerline of the tractor.

A driveline 58 connects the PTO shaft of the tractor 26 to a gear box 60 mounted to the left hand side of the header 24. The driveline 58 includes a pedestal shaft 62 mounted to the front portion 56 of the tongue 52 so as to be in substantial alignment with the PTO shaft 38 and further includes a front telescopic shaft 64 which interconnects the pedestal shaft with the PTO shaft, the shaft 64 having ujoints at its opposite ends. The driveline 58 also includes a rear telescopic shaft 66 connected between the pedestal shaft 62 and the gear box 68, the shaft 66 having u-joints at its opposite ends with the u-joint at its forward end being a wide-angle, constant velocity u-joint 68. The usage of the specialized u-joint 68 is for the purpose of efficiently transmitting torque from the pedestal shaft 62 to the rear telescopic shaft 66 which is angled relative to the shaft 66 by a substantial angle.

As can be seen in FIG. 2, the tractor 26 is capable of making a sharp right-hand turn which results in the harvester 50 pivoting about an axis O' which is located closely adjacent the left-hand tire 14. Thus, during turning the right-hand tire 14 will rotate rearwardly about the axis O' so as to result in the harvester making a clean, square cut.

With reference to FIG. 4, it can be seen that when the tractor 26 is traveling straight ahead and the tongue 52 is in its outwardly angled working position the only angle present in the driveline 58 will be that where the wide-angle, constant velocity u-joint 68 is located. Thus the driveline will be capable of efficiently transmitting torque without undue wear of the u-joints thereof. Even when the tractor is making a sharp turn, as shown in FIG. 1, the angle between the front telescopic shaft 64 and the PTO shaft 38 or pedestal shaft 62 will be no worse than that which exists with prior art harvester tongue designs when a sharp turn is being made.

Also, with reference to FIG. 4, it can be seen that, when the tongue 52 is positioned in its inward travel or transport position with the tractor 26 traveling straight ahead, the tractor will be located within the width of the path traversed by the harvester 50. It will be appreciated that this is not possible with a harvester equipped with a straight tongue like the tongue 12 illustrated in FIG. 1 since the tractor will travel a path which extends leftwardly of that traveled by the harvester.

I claim:

1. In a crop harvester including a main wheel-supported frame supporting a crop header, including a crop severing cutterbar, forwardly thereof and a draft tongue pivotally coupled to the left-hand end of the frame for movement between a working position, wherein a rear portion thereof extends outwardly and forwardly relative to the header and a forward portion thereof extends substantially in a straight ahead direction, and a transport position wherein the rear portion extends along side the header and the forward portion is angled rightwardly relative to the straight ahead direction, and a driveline being coupled for driving the header cutterbar and including a pedestal shaft supported by said forward portion of the draft tongue and being adapted for connection to a tractor PTO, the improvement comprising: said driveline pedestal shaft being supported by and extending substantially the length of the forward portion of the draft tongue and being located in substantial vertical alignment with the forward portion of the draft tongue; and said forward portion of the draft tongue being of constant cross section along its length and being exclusive of any structure which extends rightwardly thereof, whereby no structure is present which would interfere with a tractor hitched to the draft tongue and making a sharp right turn.

2. The crop harvester defined in claim 1 wherein the rear portion of the tongue is angled from the straight ahead direction through an angle in the range from 35°-45° when the tongue is in its working position.

* * * * *